United States Patent
Kehlstadt et al.

(10) Patent No.: US 6,937,225 B1
(45) Date of Patent: Aug. 30, 2005

(54) NOTIFICATION MECHANISMS ON A CONTROL DEVICE

(75) Inventors: Florian Kehlstadt, Aclens (CH); Antoine Merminod, Cully (CH); Baptiste Merminod, Vevey (CH); Olivier Campiche, Pully (CH); Julien Piot, Rolle (CH); Jean-Luc Dupraz, Echandens (CH); Laurent Plancherel, Lausanne (CH); Guy Tiphane, Menlo Park, CA (US)

(73) Assignee: Logitech Europe S.A. (CH)

( * ) Notice: Subject to any disclaimer, the term of this patent is extended or adjusted under 35 U.S.C. 154(b) by 493 days.

(21) Appl. No.: 09/750,889

(22) Filed: Dec. 27, 2000

Related U.S. Application Data (63) Continuation-in-part of application No. 09/571,006, filed on May 15, 2000.

(51) Int. Cl.⁷ .................................................. G09G 5/00
(52) U.S. Cl. ..................... 345/156; 345/163; 345/166; 463/30; 340/7.58
(58) Field of Search ................. 345/156–169, 345/701, 702, 170, 184, 520, 173, 177; 463/30, 35, 37; 340/7.57–7.58, 407.1, 407.2, 815.4

(56) References Cited

U.S. PATENT DOCUMENTS

| | | | | |
|---|---|---|---|---|
| 5,841,425 A | * | 11/1998 | Zenz, Sr. ................... 345/163 |
| 5,973,612 A | * | 10/1999 | Deo et al. ................... 340/7.58 |
| 6,211,861 B1 | * | 4/2001 | Rosenberg et al. ......... 345/163 |
| 6,400,352 B1 | * | 6/2002 | Bruneau et al. ............. 345/156 |
| 6,400,356 B1 | * | 6/2002 | Bidiville et al. ............. 345/163 |
| 6,422,942 B1 | * | 7/2002 | Jeffway et al. .............. 463/31 |
| 6,448,977 B1 | * | 9/2002 | Braun et al. ................. 345/701 |
| 6,452,586 B1 | | 9/2002 | Holmdahl et al. |

OTHER PUBLICATIONS

Email Mouse & Hub 4port. Datasheet [online]. Arvel Co., Japan, 2001 [retrieved on May 31, 2001]. Retrieved from the Internet: <URL: http://www.arvel.co.jp/e mouse hub/index.html>. Translated on Jun. 5, 2001, a copy of which is attached.

* cited by examiner

*Primary Examiner*—Ba Huynh
*Assistant Examiner*—Tadesse Hailu
(74) *Attorney, Agent, or Firm*—Fenwick & West LLP (57) ABSTRACT

The method and system serve to notify the user of an event through a control device. Active notification takes place even when the computer sound and screen are disabled, for example, when in a power saving mode or screen saving mode. Notification may include visual notification, audio notification, vibratory notification, or tactile notification. Tactile notification can also serve to provide a private notification system which will not alert or disturb other people in the vicinity of the user. Such tactile notification can be provided by means of a texture change in the surface of the control device. One way in which this could be done is by raising a plurality of pegs through the surface of a control device to change its texture.

23 Claims, 7 Drawing Sheets

FIG.3A    Magnet + own field

FIG.3B    Coil + own field

Puls

FIG.3C    Magnet — Iron

FIG.3D    Magnet — Iron — Coil

NOTIFICATION MECHANISMS ON A CONTROL DEVICE

CROSS REFERENCE TO RELATED APPLICATIONS

This application is a continuation-in-part of U.S. application Ser. No. 09/571,006, by Guy Tiphane and Denis Pavillard, filed on May 15, 2000, entitled "RAPID NETWORK ACCESS WITH INTERACTIVITY" which is herein incorporated by reference in its entirety.

This application is related to U.S. application Ser. No. 09/684,109, by Guy Tiphane, filed on Oct. 6, 2000, entitled "PROXIMITY DETECTOR TO INDICATE FUNCTION OF A KEY" which is herein incorporated by reference in its entirety.

This application is related to U.S. application Ser. No. 09/715,209, by Guy Tiphane, filed on Nov. 14, 2000, entitled "MULTIPLE EVENT KEYBOARD DISPLAY" which is herein incorporated by reference in its entirety.

BACKGROUND OF THE INVENTION

1. Field of the Invention

The present invention relates to event notification, and more particularly, to notifying a computer user of events by changes on a control device.

2. Description of Background Art

The use of personal computers and workstations is becoming increasingly ubiquitous in all phases of professional and personal life, and the need for sophisticated methods of communication between a peripheral and a host system is becoming fundamental to the successful operation of the overall system. The variety of available peripherals has expanded dramatically with the increasing power available from the microprocessors, available for such systems. In particular, control devices such as keyboards, mice, trackballs, touch pads, game pads, joysticks, remote controllers, and so on are well-known for use with host systems of many types, including PCs, workstations and other types of microprocessor-controlled devices including video game systems, or other office or household devices.

These various types of control devices were conventionally used to input data to the host system, and to instruct the host system regarding actions desired by the user. Apart from instructing the host system regarding what the user desires, it is also desirable to inform the user when certain events take place on the host system and/or on a network to which the host system may be connected.

Traditionally, notification mechanisms have included some kind of sound for alerting the user that a certain event has occurred. For example, the host system could sound a chime to indicate to the user that she has received an email message. Another example of the use of sound as a notification mechanism is the emanation of a chime sound to signal a calendar alarm. Other notification mechanisms include pop-up windows or icons on some display (e.g. a monitor). For instance, a user may be notified of the arrival of an email message in her inbox by an envelope icon popping up on the user's monitor. Similarly, a user may be reminded of an appointment on her calendar by a pop-up window describing the appointment.

However, these traditional notification mechanisms involve either the visual or the auditory senses. As a result, these notifications make public to other people in the user's vicinity when a certain event has occurred. For example, it is often possible for other people in the user's vicinity to hear a sound emanated by the host system, or to see a pop-up window or icon on the user's monitor. This public nature of notification has several problems. First, such notifications may be disruptive to other people around the user. Second, the user can have no expectation of privacy regarding the notification of certain events. Thus she may not wish to be notified in such manners of events for which she desires confidentiality, even though being apprised of the occurrence of the event may otherwise be very important to her.

Another problem with notification by means of pop-up icons and windows is that while external events may be announced on the computer screen, such notifications may be unnoticed if the user is not working directly on the screen, or if the screen is in power saving mode. Similarly, in power saving mode, computer sound sources are usually disabled, hence depriving the user from active notification.

Accordingly, there is a need for a system and method for notifying the user of an event when she is not facing the screen, or when the screen in power saving mode. In addition, there is a need for notification mechanisms that do not disturb other people in the vicinity of the user. Further, there exists a need for notification mechanisms that would preserve the user's expectation of privacy, and notify only the user of the occurrence of an event.

SUMMARY OF THE INVENTION

The present invention is a system and method for providing the user with notification of an event by means of a control device. Such notifications can alert the user to the occurrence of events even when she is not facing the screen, or when the screen is in the power saving mode, or when the user desires privacy regarding the notification and/or does not want to disturb the other people in the vicinity of the user.

In one embodiment, visual effects are created in the control device to attract the user's attention when she is not facing the screen, or when the screen is in a power saving mode. In another embodiment, audible notification may be provided to the user by the control device.

In one embodiment, the present invention uses a tactile sense to signal an event to the user without disturbing others. The present invention takes advantage of a user's hand/fingers resting over the pointing device when interacting with the computer, and that the fingers offer extremely acute tactile sense. In one embodiment, tactile feedback is applied by changing the button texture, while other forms or locations are possible. In other embodiments, the shape or temperature of the control device can be varied.

Any of the notification mechanisms described above may be launched when one or more pre-selected events occur. For example, a computer signals an occurrence of an event to the control device, which will in turn activate a feedback system.

In another embodiment, the present invention provides techniques for a user to monitor events and conveniently access information related to those events. In one embodiment, the technique makes use of a general-purpose notifier (for example, a light source such as an LED on an event button or adjacent to an event button). The technique utilizes a light source to signal a user of an event or events warranting the user's attention. For example, the light source may be correlated with a stock price event so that the light source turns on when a stock price has passed a certain (upper or lower) threshold.

BRIEF DESCRIPTION OF THE DRAWINGS

The above and other more detailed and specific objects and features of the present invention are more fully disclosed in the following detailed description, reference being made to the accompanying drawings, in which.

DETAILED DESCRIPTION OF THE PREFERRED EMBODIMENTS

The figures depict a preferred embodiment of the present invention for purposes of illustration only. It is noted that similar or like reference numbers in the figures indicate similar or like functionality. One of skill in the art will readily recognize from the following discussion that alternative embodiments of the structures and methods disclosed herein may be employed without departing from the principles of the invention(s) disclosed herein.

Figure 1:
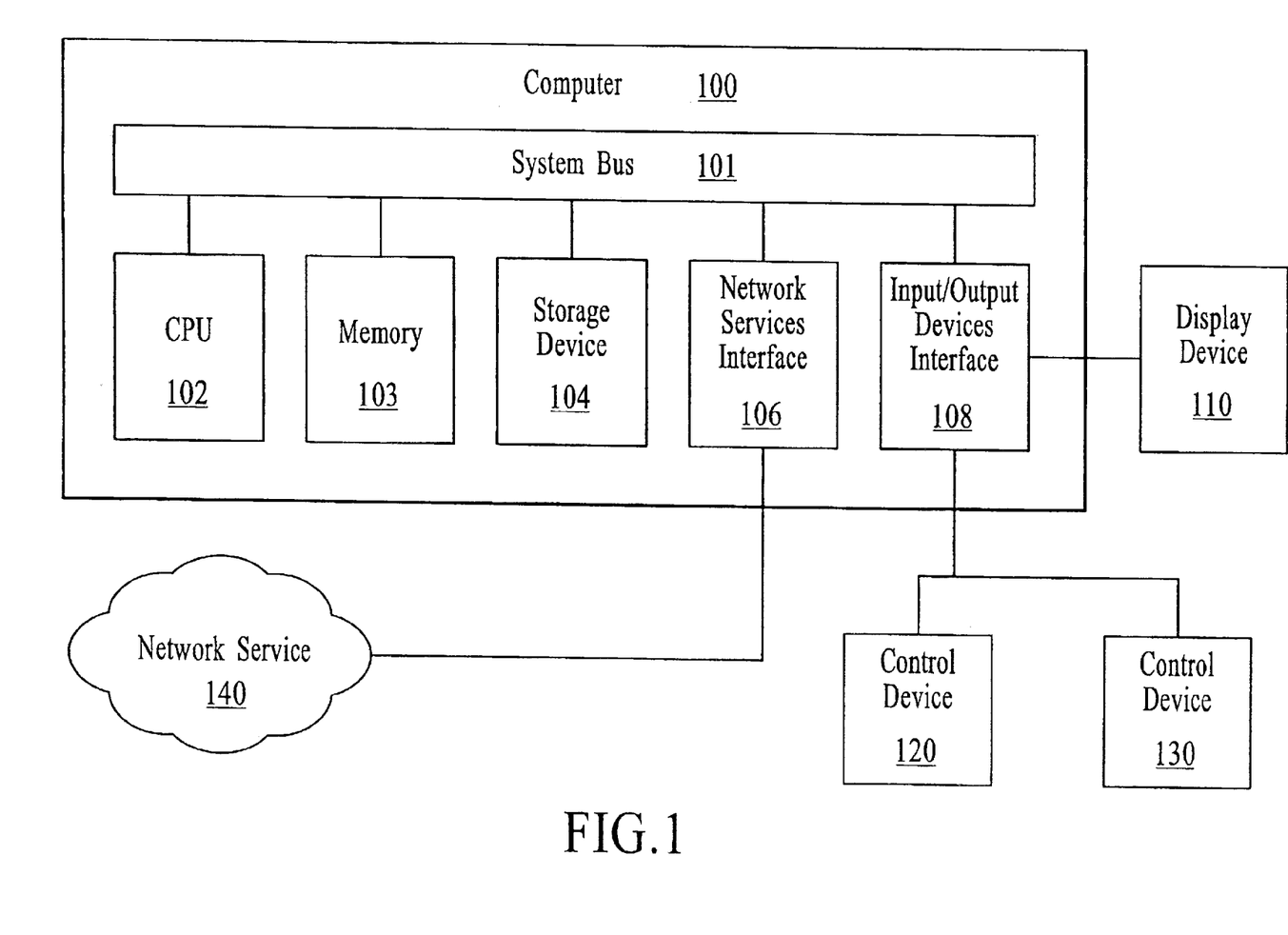
FIG. 1 is a block diagram of a computer system which can be used in accordance with an embodiment of the present invention.

FIG. 1 illustrates a block diagram of a computer system which can be used in accordance with an embodiment of the present invention. It comprises a host computer 100, a display device 110, and two control devices 120 and 130. The host computer is connected to a network service 140.

The host computer 100 is a general purpose computer. Referring to FIG. 1, a host computer 100 includes a bus system 101, central processing unit (CPU) 102, a memory 103, a storage device 104, a network services interface 106, and a conventional input/output device interface 108.

The system bus 101 is a conventional system bus such as, for example, a peripheral connection interface ("PCI") bus or an industry standard architecture ("ISA") bus. The CPU 102 is a conventional processing unit such as, for example, an Intel Pentium®-class processor or a Sun Microsystems SPARC® processor. The memory 103 is a conventional memory system such as, for example, a dynamic random access memory ("DRAM") or a static random access memory ("SRAM"). The storage device 104 is a conventional storage device connection such as, for example, a SCSI interface or an integrated drive electronics ("IDE") interface. The storage device 104 may be used to connect a magnetic disk drive, a tape drive, a compact disk drive, or a solid-state storage device. The network service interface 106 includes those hardware and software components that allow for connecting to a conventional network service. For example, the network service interface 106 may include a connection to a telecommunications line (e.g., a dial-up, digital subscriber line ("DSL"), a T1, or a T3 communication line). The host computer 100, the storage device 104, and the network services interface 106, may be available from, for example, IBM Corporation (Armonk, N.Y.), Sun Microsystems, Inc. (Palo Alto, Calif.), Hewlett-Packard, Inc. (Palo Alto, Calif.), or Compaq Computer Corporation (Houston, Tex.).

The input/output devices interface 108 can include a conventional pointing device input/output such as, for example, a Universal Serial Bus ("USB") port, an IBM PS/2® or compatible port, a serial port, or a stylus input/output connection. The input/output devices interface 108 may also include a keyboard input/output such as, for example, a USB port, a keyboard port, or a touch keyboard connection. The input/output devices interface 108 may also include USB ports for USB devices, small computer systems interfaces ("SCSI") for SCSI devices, or other like input/output ports and devices.

The display device 110 is typically a monitor, and may be available from, for example, Sony Corporation (Tokyo, Japan), or ViewSonic Corporation (Walnut, Calif.). Alternately, the display device may be a television display or any other type of display.

The network service 140 is a network such as a wide area network or a local area network. The wide area network may include the Internet, the Internet 2, and the like. The local area network may include an Intranet, which may be a network based on, for example, TCP/IP belonging to an organization accessible only by the organization's members, employees, or others with authorization. The local area network may also be a network such as, for example, Netware™ from Novell Corporation (Provo, ULT) or Windows NT™ from Microsoft Corporation (Redmond, Wash.). The network service 140 may also include commercially available subscription-based services such as, for example, AOL from America Online, Inc. (Dulles, Va.) or MSN from Microsoft Corporation (Redmond, Wash.).

The control devices 120 and 130 are typically keyboards, mouse devices, touchpads, or joysticks. Control devices are available from various manufacturers including Logitech (Fremont, Calif.) and Microsoft Corporation (Redmond, Wash.). It is noted that a keyboard typically includes a set of alpha-numeric keys, for example, in the QWERTY configuration and a numeric keypad.

Control devices 120, 130 are conventionally used to communicate user requests to the host computer 100. In addition, in accordance with one embodiment of the present invention, the control devices 120, 130 can be used for purposes of notifying the user of one or more events. For purposes of illustration, much of the following discussion refers to a mouse. However, it is understood that the principles described in the present invention are applicable and may be implemented with other control devices, for example joysticks, trackballs, or touch pads.

For several of the different embodiments of the present invention, the host computer 100 sends a command to the control device 120, 130 whenever notification of an event is required. The command can be sent over regular transmission protocols such a USB, PS2, or bi-directional wireless channel. In one embodiment of the present invention, the host computer 100 itself monitors the events. In another embodiment, monitoring of the events may be tracked by using a centralized server. The server would store events to be monitored per user in a database, utilize a connection to the network service 140 to monitor those events, update the database upon occurrence of those events, and send a message to the user's control device 120, 130 notifying it of the occurrences.

The various notification mechanisms described below can be used to notify users of the occurrence of one or multiple events. One example of an event is receipt of an email by the user. As another example, an event may comprise a stock symbol trading above or below a certain threshold price. Another event may comprise shipping of a product purchased via an e-commerce transaction, such as the shipping of a book ordered via Amazon.com. Different events may also have different levels of urgency associated with them. The level of urgency associated with an event could also be communicated to the user by the notification mechanisms.

In one embodiment of the present invention, visual effects created in the control device 120, 130 will attract the user attention also when not facing the screen. In one embodiment, one or more light sources, for example, Light Emitting Diodes (LED), can be used to signal the occurrence of an event to a user. In one embodiment, the notification could be via an illuminated logo. In another embodiment, the notification could be via an illuminated ball in a trackball assembly. In yet another embodiment, the notification could be via an illuminated roller. Urgent events may be communicated by blinking notification signals, while non-urgent events may be communicated by light sources simply turning and staying on.

In one embodiment of the present invention, audio signals emanating from the control device 120, 130, or vibrations of the control device 120, 130, may serve as notification mechanisms. Audible notification may raise the user's attention even when the user is not currently using the computer. In one embodiment, a buzzer/loudspeaker could be included in the control device 120, 130. In another embodiment, built-in vibrating elements may be included in the control device 120, 130.

In one embodiment of the present invention, tactile feedback can be used as a notification mechanism. While this method is effective only when the user's hands are resting on the pointing device, it nonetheless provides the user with a private means of notification which does not disturb others in the vicinity of the user. In one embodiment of the present invention, tactile feedback is obtained by altering the surface default texture of a control device to an alternate unique modified texture. Multi-form texture can also be implemented in an embodiment of the present invention.

Figure 2A:
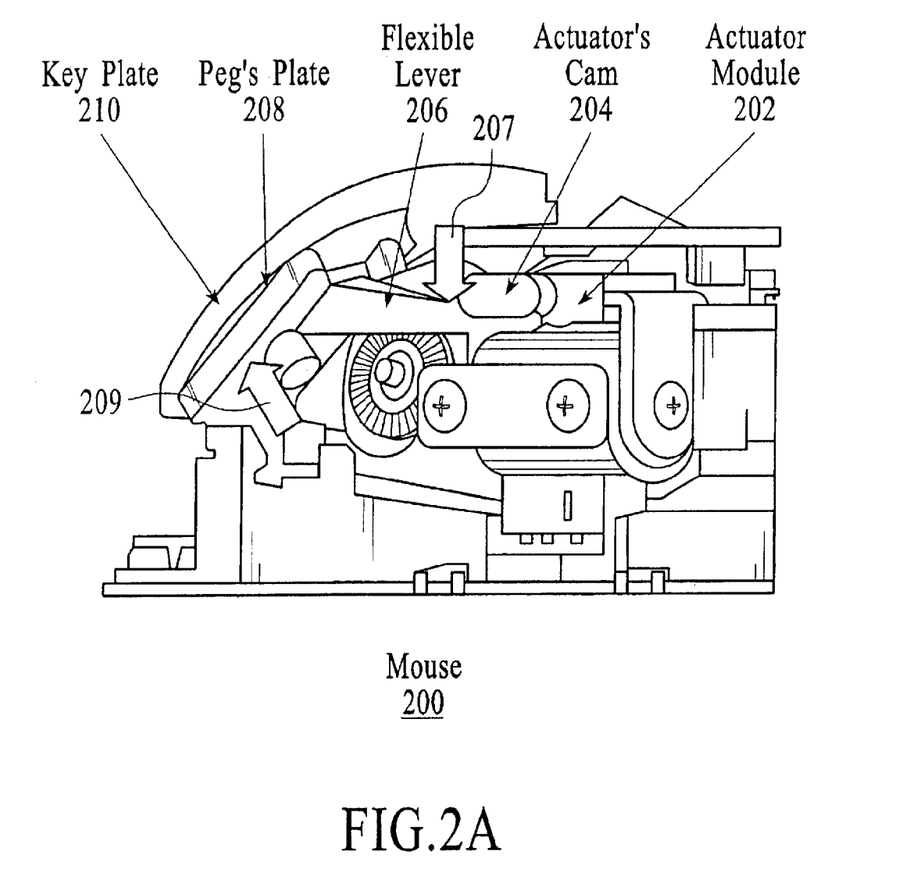
FIG. 2A is the inside of a mouse in accordance with an embodiment of the present invention.

FIG. 2A illustrates one embodiment of the present invention which provides notification to a user by a change in the texture of a button on a mouse. FIG. 2A depicts the inside of a mouse 200 in accordance with an embodiment of the present invention. Mouse 200 includes an actuator module 202, the actuator's cam 204, a flexible lever 206, a pegs plate 208, and a key plate 210.

In the embodiment illustrated in FIG. 2A, the texture alteration of the surface of the mouse 200 is obtained by lifting a matrix of tiny pegs on a peg plate 208. The actuator module 202 rotates the cam 204. The cam 204 in turn pushes over the flexible lever 206, as indicated by arrow 207. The base of the flexible lever 206 deforms, and pushes the pegs plate 208 as indicated by arrow 209. In one embodiment, the peg matrix faces a hole matrix located on the top case 212 of the mouse 200. The peg matrix and the mouse button thus form a single assembly, through which the pegs can rise to provide an altered texture. When the pegs plate 208 is pushed 209, the pegs protrude through the key plate 210 to appear through the top case 212 of the mouse 200. Having the pegs arising out of the mouse key plate 210 (or not) do not modify the standard behaviour of the key, but only its texture. No force is applied on the key plate 210 that could be felt by the user's finger activating it.

Figure 2B:
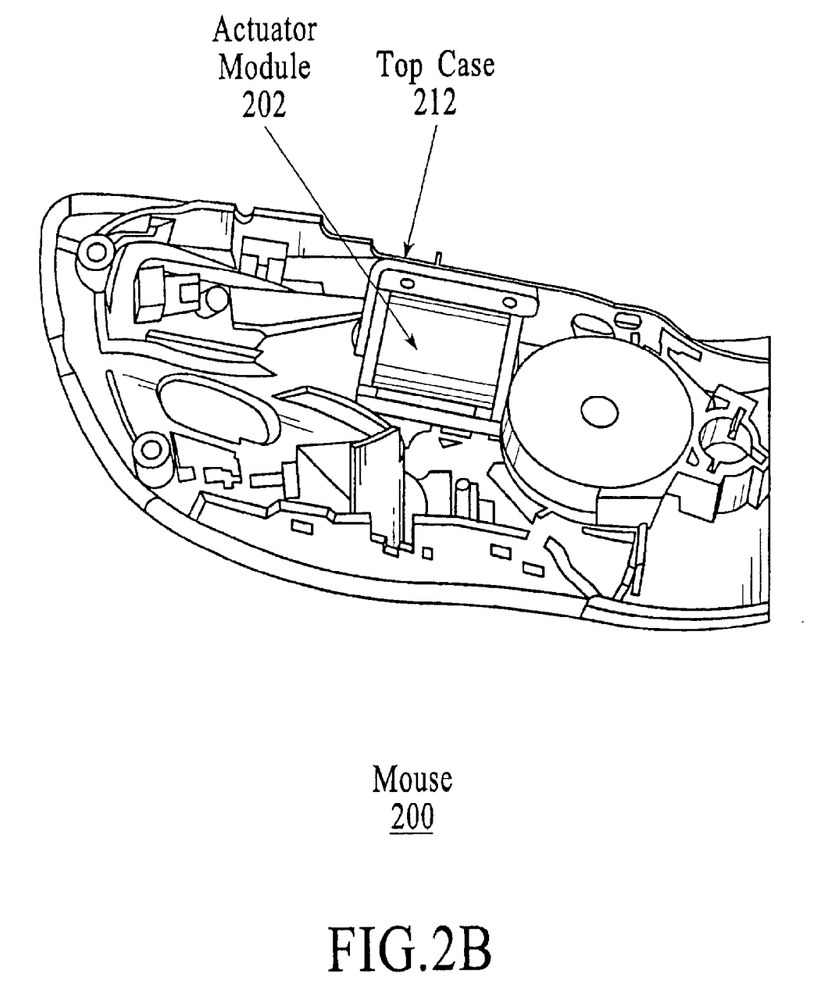
FIG. 2B is an inside view of the top case of a mouse in accordance with an embodiment of the present invention.
Figure 2C:
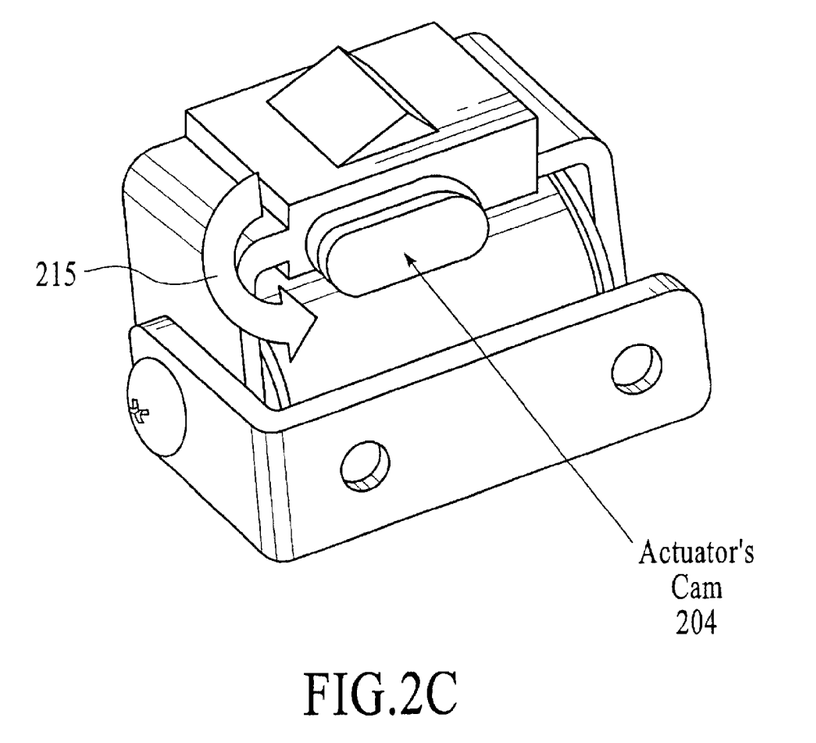
FIG. 2C is a view of the actuator's cam in accordance with one embodiment of the present invention.

FIG. 2B is an inside view of the top case 212 of the mouse 200. It can be seen that the actuator module 202 is fixed to the top case 212 with screws in this embodiment. FIG. 2C is a closer view of the actuator's cam 204. In one embodiment, the cam 204 is a rotating lever that is rotated by the actuator module 202 in a direction indicated by arrow 215.

Figure 2D:
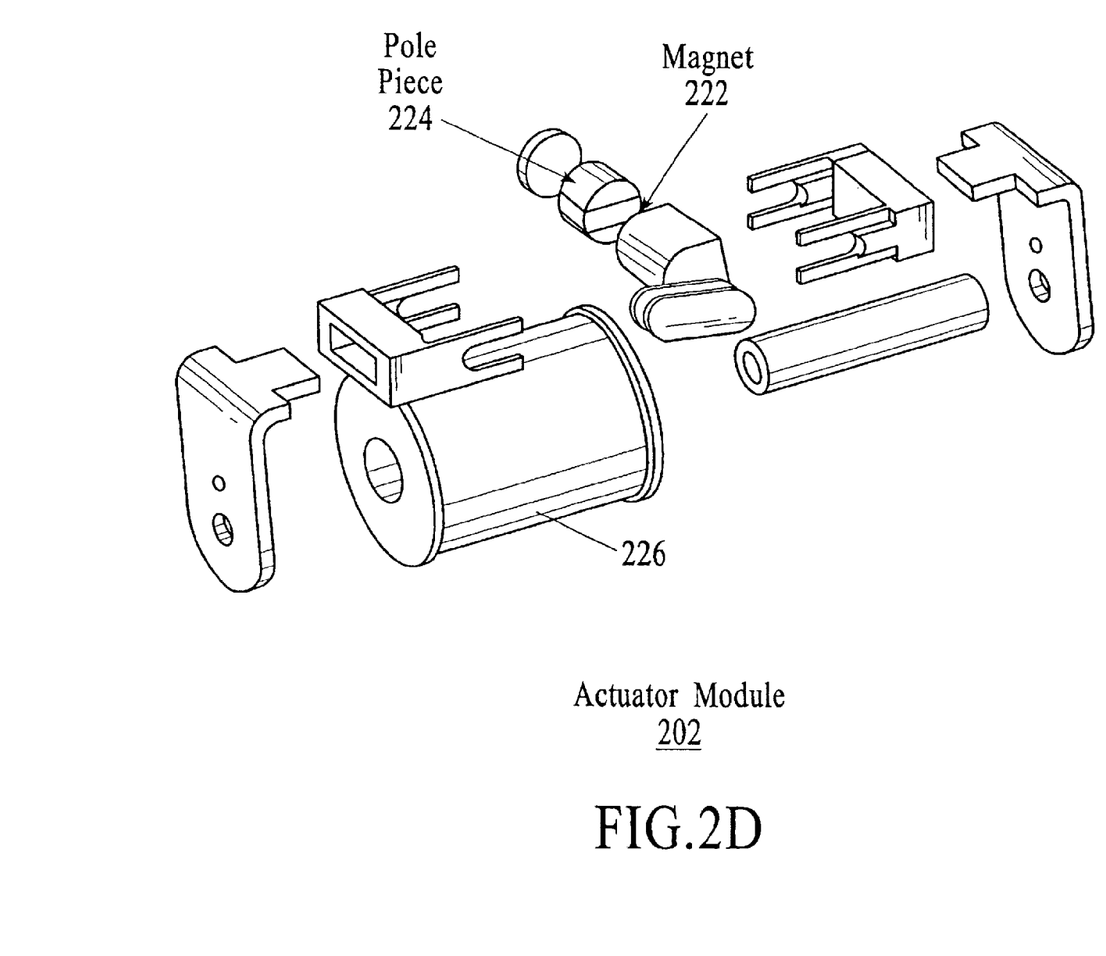
FIG. 2D is an exploded view of the actuator module in accordance with one embodiment of the present invention.
Figure 3A:
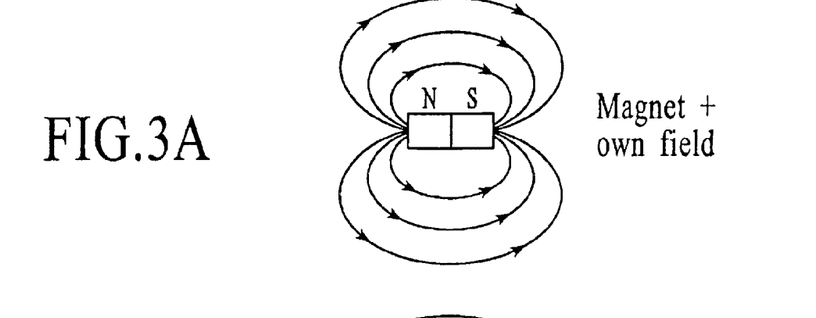
FIG. 3A illustrates a magnet and a magnetic field created in accordance with an embodiment of the present invention.
Figure 3B:
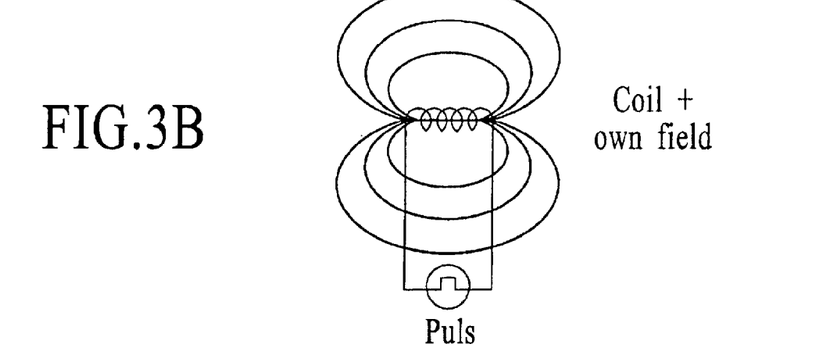
FIG. 3B illustrates a magnetic field created by a varying current passing through a coil.
Figure 3C:
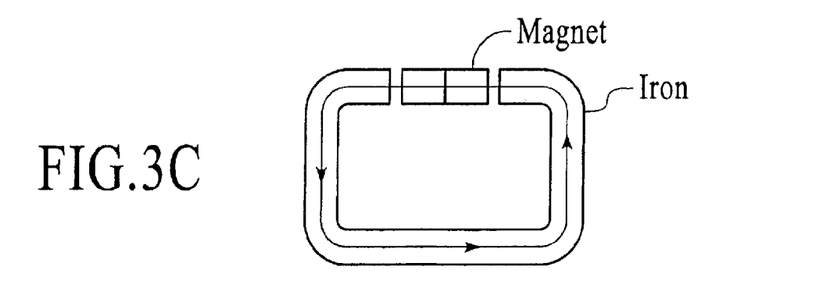
FIG. 3C illustrates a magnetic field created in a magnetic material.
Figure 3D:
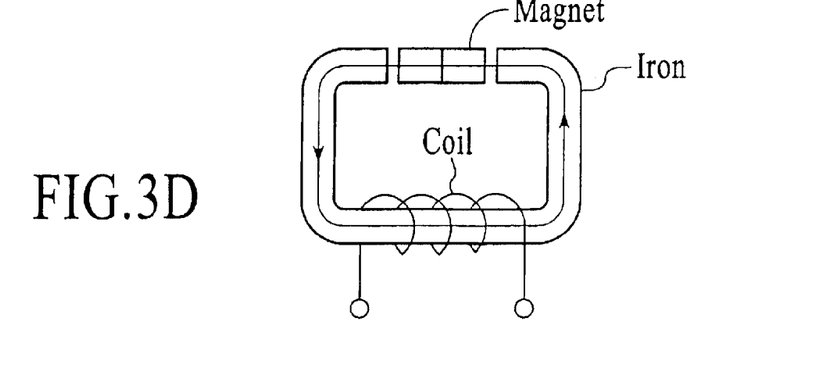
FIG. 3D illustrates a magnetic field generated by a varying current passing through a coil, superimposed on a magnetic field created in a magnetic material.

FIG. 2D is an exploded view of the actuator module 202. Its function is to insure that the pegs matrix is either up or down. Such an actuator may be referred to as a "bi-stable". "Bi-stable" indicates that the actuator only has two stable states (that is, on or off). This actuator needs energy to only change from one state to the other.

In the embodiment depicted in FIG. 2D, a reluctant electromagnetic polarized circuit (moving magnet) that functions as an actuator is used to advance the peg matrix by rotating the cam 204. "Polarized" means that the circuit contains a permanent magnet 222, which insures two stable positions of the rotating cam 204. These stable positions are where the magnetic field created by the magnet is best aligned with magnetic circuit (pole piece 224), giving the system a minimal reluctance (energy). The actuator module 202 includes a permanent magnet 222 attached to the cam 204, a pole piece 224, and a coil 226. As the magnet 222 is linked to the cam 204, its rotation can be driven by the coil's magnetic field. Indeed, a current pulse in the coil 226 creates a magnetic field in the pole piece 224 and the magnet aligns its own magnetic field to the one created by the coil by rotating itself (with the cam 204). A current pulse in the other direction makes the magnet returns to its first position.

In an alternate embodiment, a solenoid actuator can be used. As this electromagnetic circuit is not polarized, the actuator has only one stable state (from, e.g., an added spring function). Due to the desirability of a "bi-stable" function, using such a mono-stable actuator would result in increased power consumption to maintain the non-stable state, but provides the advantage of a very fast response. In yet another embodiment, the matrix of pegs could be lifted by using an electromechanical system.

Figure 4A:
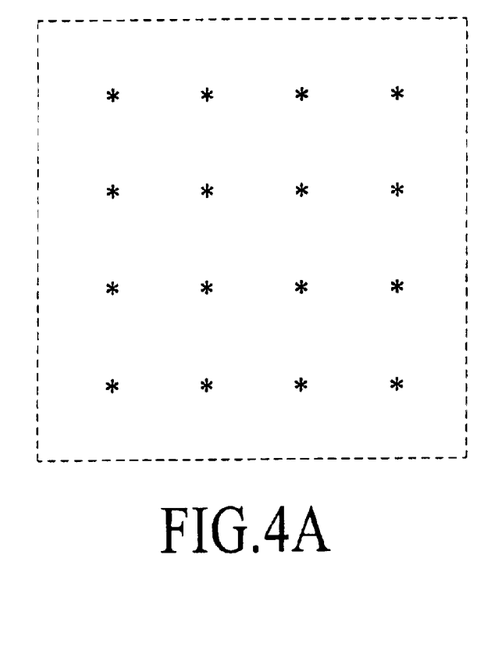
FIG. 4A illustrates pegs arranged in a grid structure in accordance with one embodiment of the present invention.
Figure 4B:
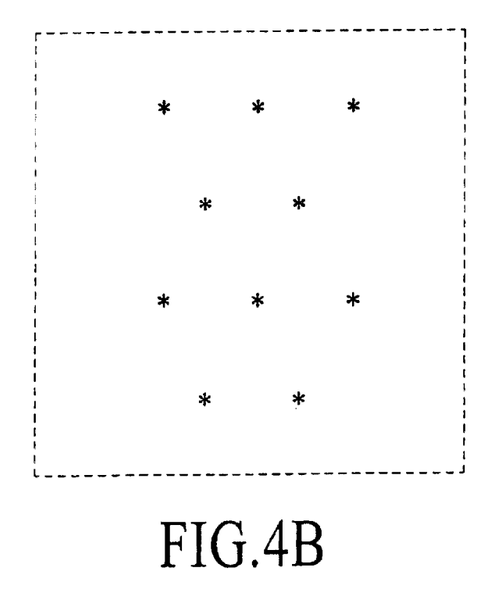
FIG. 4B illustrates pegs arranged in a quincunx structure in accordance with one embodiment of the present invention.

It is to be noted that the matrix in which the pegs are arranged can be varied. In one embodiment, the matrix can be arranged using a grid structure as shown in FIG. 4A. As can be seen from FIG. 4A, a grid structure is one where the pegs are aligned along both directions. In another embodiment, the matrix can be arranged using a quincunx structure as shown in FIG. 4B. As can be seen from FIG. 4B, a quincunx structure is one where the pegs are aligned in diagonals or shifted off half intervals. The shape of each of the pegs can also be varied, and the peg shape can be adjusted according to comfort criteria.

In one embodiment, the texture of a mouse button may be altered in different ways depending on the level of urgency of an event. In another embodiment, the peg matrix may be raised in stages (instead of all at once), so as to create a wave-like sensation on the user's fingertips to indicate the occurrence of an urgent event, or of multiple events.

It is to be noted that one or more of the various different embodiments of the invention described above can be combined in a single control device for additional effectiveness. For instance, a control device could provide a user with both visual as well as tactile notification of an event.

Once the user is notified of the occurrence of an event, in one embodiment, the user could press on the mouse button to access the event that she is being notified of. The single press could, in one embodiment, launch an application program related to the event and automatically instruct the program to access the event. For example, if the event were a stock passing a threshold price, then the single press may launch a web browser and automatically access a web page of an online brokerage with which the user has an account.

Moreover, the user may be able to access in series, multiple events of which she is notified, by pressing the event button once per event to be accessed. For example, consider a case with two events. A first press of the mouse button would launch an application program related to a first event and automatically instruct the program to access the first event. After the user is done accessing the first event, the user could then access the second event indicated by the notification mechanism by a second press of the mouse button. The second press would launch an application program related to the second event and automatically instruct the program to access the second event. After the user is done accessing the second event, the notification mechanism may turn off, indicating the absence of another event.

Upon reading this disclosure, those of skill in the art will appreciate still additional alternative methods and designs for an antenna system in accordance with the present invention. Thus, while particular embodiments and applications of the present invention have been illustrated and described, it is to be understood that the invention is not limited to the precise construction and components disclosed herein and that various modifications, changes and variations which will be apparent to those skilled in the art may be made in the arrangement, operation and details of the method and apparatus of the present invention disclosed herein without departing from the spirit and scope of the invention as defined in the following claims.

What is claimed is:

1. A method of providing information from a host computer to a user through a control device, the host computer located apart from the control device, the method comprising:
    receiving an event signal at the control device from the host computer indicating an occurrence of an event; and
    responsive to receiving the event signal, generating a notification signal to alter a characteristic within a bounded region of the control device to notify the user that the event has occurred,
    wherein generating the notification signal comprises altering a visual indicator within the bounded region on the control device, and altering the visual indicator comprises illuminating a light source on the control device.

2. The method of claim 1 wherein the light source blinks to indicate that the event is urgent.

3. The method of claim 1, wherein generating the notification signal further comprises:
    providing the user with an audio indication through the control device that the event has occurred.

4. The method of claim 1, wherein generating the notification signal further comprises:
    providing the user with a vibratory indication within the bounded region on the control device that the event has occurred.

5. The method of claim 1, wherein generating the notification signal further comprises:
    providing the user with a tactile indication within the bounded region on the control device that the event has occurred.

6. A method for notifying a computer user of occurrence of an event, the method comprising:
    receiving an event signal from a host computer at a control device that the event has occurred, the control device including a surface having a texture that is alterable; and
    responsive to the event signal from the host computer, altering the texture on the surface of the control device to provide a tactile indication to notifying the user that the event has occurred, wherein altering the texture comprises raising a plurality of pegs through a plurality of apertures in the surface of the control device.

7. The method of claim 6, wherein rising the plurality of pegs comprises:
    rotating an actuator to push a lever which is communicatively coupled to the plurality of pegs.

8. The method of claim 7, wherein the actuator is of electromagnetic type.

9. The method of claim 8, wherein the electromagnetic actuator is bi-stable.

10. The method of claim 7, wherein the actuator is a solenid.

11. The method of claim 6, wherein the plurality of pegs is in a grid shape.

12. The method of claim 6, the plurality of pegs is in a quincunx shape.

13. The method of claim 6, wherein the control device is a mouse.

14. A method for notifying a computer user of occurrence of an event, the method comprising:
    communicating from a host computer to a mouse that the event has occurred, the mouse having a region on its surface for an alterable texture; and
    responsive to the communication from the host computer, altering the texture on the region on the surface of the mouse to notify the user that the event has occurred, wherein ale the texture comprises raising a plurality of pegs through a plurality of apertures in the region on the mouse.

15. A system for notifying a computer user of an occurrence of an event by changing a texture of a region on a control device bring used by the user, the system comprising:
    a plurality of pegs in the region on the control device for changing the texture of the control device; and
    an actuator module for controlling the plurality of pegs.

16. A system for notifying a computer user of an occurrence of an event by changing a texture of a region on a control device being used by the computer user, the system comprising:
    a key plate on the region of the control device; and
    a pegs plate comprising a plurality of pegs a portion of which can protrude through the key plate to change the texture of the region on the control device.

17. A system for notifying a computer user of an occurrence of an event by changing a texture of a region on a control device being used by the user, the system comprising:
    a key plate on the region on the control device;
    a pegs plate comprising a plurality of pegs, a portion of which can protrude rough the key plate to change the texture of the region on the control device;
    a lever communicatively coupled to the pegs plate to reposition the pegs plate with respect to the key plate;
    a cam communicatively coupled to the lever for manipulating the lever; and an actuator module communicatively coupled to the cam for rotating the cam.

18. The system of claim 17 wherein the actuator module is bi-stable.

19. The system of claim 17 wherein the actuator module comprises a solenoid.

20. The system of claim 17 wherein the lever is flexible.

21. The system of claim 17 wherein the pegs plate comprises a plurality of pegs in a grid shape.

22. The system of claim 17 wherein the pegs plate comprises a plurality of pegs in a quincunx configuration.

23. A method for notifying a computer user of occurrence of an event, the method comprising:

receiving an event signal from a host computer at a control device that the event has occurred, the control device including a surface having a texture that is alterable; and responsive to the event signal from the host computer, altering the texture in the region on the control device to provide tactile information to notify the user that the event has occurred, wherein altering the texture comprises raising a plurality of pegs through a plurality of apertures on the surface of the control device.

* * * * *

UNITED STATES PATENT AND TRADEMARK OFFICE
CERTIFICATE OF CORRECTION

PATENT NO. : 6,937,225 B1
DATED : August 30, 2005
INVENTOR(S) : Florian Kehlstadt et al.

It is certified that error appears in the above-identified patent and that said Letters Patent is hereby corrected as shown below:

<u>Column 8,</u>
Line 13, replace "rising" with -- raising --.
Line 22, replace "solenid" with -- solenoid --.
Line 25, before "the plurality" insert -- wherein --.
Line 37, replace "ale" with -- altering --.
Line 41, replace "a texture" with -- the texture --.
Line 41, replace "a control" with -- the control --.
Line 52, atfer "pegs" insert -- , --.

Signed and Sealed this

Thirteenth Day of December, 2005

JON W. DUDAS
*Director of the United States Patent and Trademark Office*